United States Patent [19]

Zuravleff et al.

[11] Patent Number: 5,812,799
[45] Date of Patent: Sep. 22, 1998

[54] NON-BLOCKING LOAD BUFFER AND A MULTIPLE-PRIORITY MEMORY SYSTEM FOR REAL-TIME MULTIPROCESSING

[75] Inventors: William K. Zuravleff, Mountainview; Mark Semmelmeyer, Sunnyvale; Timothy Robinson, Boulder Creek; Scott Furman, Union City, all of Calif.

[73] Assignee: Microunity Systems Engineering, Inc., Sunnyvale, Calif.

[21] Appl. No.: 480,738

[22] Filed: Jun. 7, 1995

[51] Int. Cl.[6] .................................................. H01J 13/00
[52] U.S. Cl. ......................... 395/308; 395/837; 395/838; 395/840; 395/859; 395/876
[58] Field of Search .................................... 395/306, 307, 395/308, 292, 309, 438, 441, 479, 468, 469, 470, 250, 840, 841, 842, 847, 849, 859, 861, 864, 863, 872, 874, 876

[56] References Cited

U.S. PATENT DOCUMENTS

| | | | |
|---|---|---|---|
| 4,833,655 | 5/1989 | Wolf et al. | 365/221 |
| 5,043,981 | 8/1991 | Firoozmand et al. | |
| 5,179,688 | 1/1993 | Brown et al. | 395/425 |
| 5,208,490 | 5/1993 | Yetter | 307/452 |
| 5,249,297 | 9/1993 | Brockmann et al. | 395/725 |
| 5,257,356 | 10/1993 | Brockmann et al. | 395/725 |
| 5,289,403 | 2/1994 | Yetter | 365/49 |
| 5,299,158 | 3/1994 | Mason et al. | 365/189.04 |
| 5,317,204 | 5/1994 | Yetter | 307/443 |
| 5,329,176 | 7/1994 | Miller, Jr. et al. | 307/443 |
| 5,343,096 | 8/1994 | Heikes et al. | 307/480 |
| 5,363,485 | 11/1994 | Nguyen et al. | 395/250 |
| 5,367,681 | 11/1994 | Foss et al. | 395/650 |
| 5,450,564 | 9/1995 | Hassler et al. | 395/495 |
| 5,459,839 | 10/1995 | Swarts et al. | 395/650 |
| 5,499,346 | 3/1996 | Amini et al. | 395/308 |
| 5,507,032 | 4/1996 | Kimura | 395/826 |
| 5,526,508 | 6/1996 | Park et al. | 395/449 |
| 5,535,340 | 7/1996 | Bell et al. | 395/292 |
| 5,541,912 | 7/1996 | Choudhury et al. | |
| 5,542,055 | 7/1996 | Amini et al. | 395/308 |
| 5,546,546 | 8/1996 | Bell et al. | 395/292 |
| 5,548,791 | 8/1996 | Casper et al. | 395/858 |
| 5,557,744 | 9/1996 | Kobayakawa et al. | 395/200.01 |
| 5,568,620 | 10/1996 | Sarangdhar et al. | 395/285 |
| 5,588,125 | 12/1996 | Bennett | 395/306 |
| 5,623,628 | 4/1997 | Brayton et al. | 395/468 |
| 5,625,778 | 4/1997 | Childers et al. | 395/287 |

OTHER PUBLICATIONS

Eric DeLano et al., "A High Speed Superscaler PA–RISC Processor", IEEE, pp. 116–121, 1992.

Doug Hunt, "Advanced Performance Features of the 64-bit PA–8000", IEEE, pp. 123–128, 1995.

Jonathan Lotz et al., "A CMOS RISC CPU Designed for Sustained High Performance on Large Applications", IEEE Journal of Solid–State Circuits, vol. 25, pp. 1190–1198, Oct. 1990.

Primary Examiner—Jack B. Harvey
Assistant Examiner—Raymond N. Phan
Attorney, Agent, or Firm—Burns, Doane, Swecker & Mathis, L.L.P.

[57] ABSTRACT

A non-blocking load buffer for use in a high-speed microprocessor and memory system. The non-blocking load buffer interfaces a high-speed processor/cache bus, which connects a processor and a cache to the non-blocking load buffer, with a lower speed peripheral bus, which connects to peripheral devices. The non-blocking load buffer allows data to be retrieved from relatively low bandwidth peripheral devices directly from programmed I/O of the processor at the maximum rate of the peripherals so that the data may be processed and stored without unnecessarily idling the processor. I/O requests from several processors within a multiprocessor may simultaneously be buffered so that a plurality of non-blocking loads may be processed during the latency period of the device. As a result, a continuous maximum throughput from multiple I/O devices by the programmed I/O of the processor is achieved and the time required for completing tasks and processing data may be reduced. Also, a multiple priority non-blocking load buffer is provided for serving a multiprocessor running real-time processes of varying deadlines by prioritization-based scheduling of memory and peripheral accesses.

34 Claims, 9 Drawing Sheets

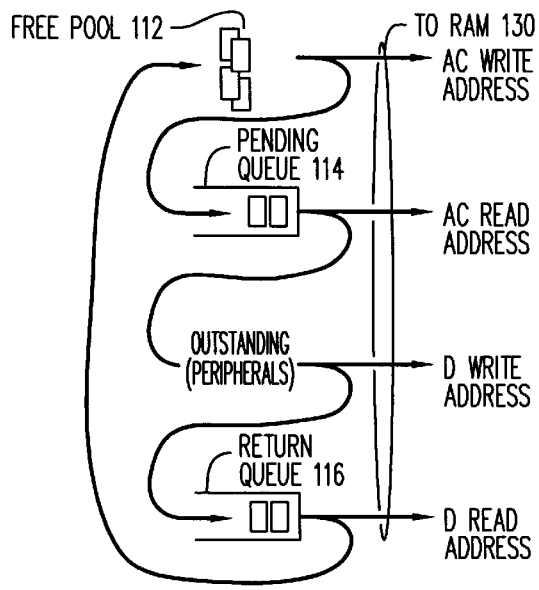
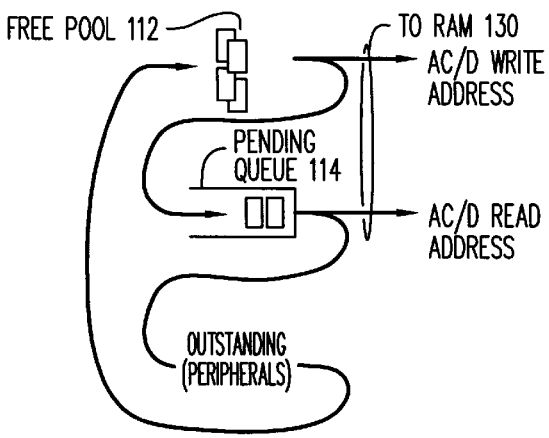
*FIG. 7(a)*  *FIG. 7(b)*
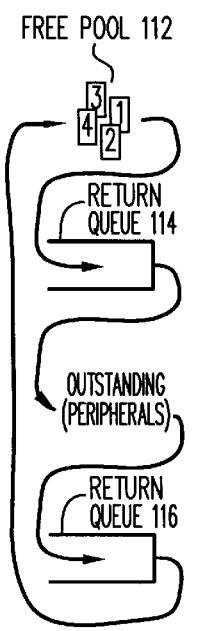 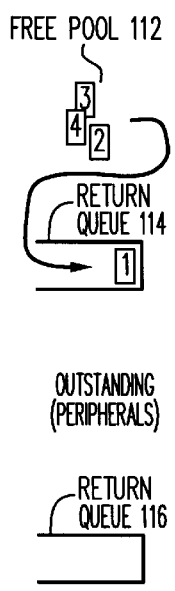 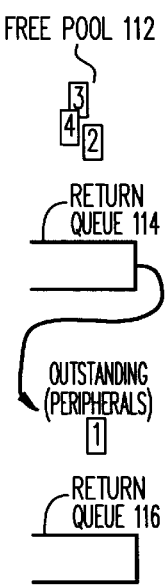 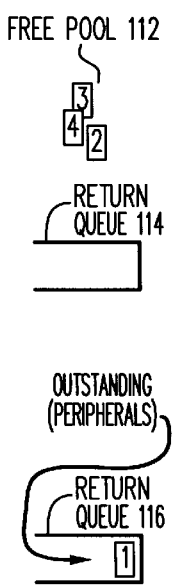 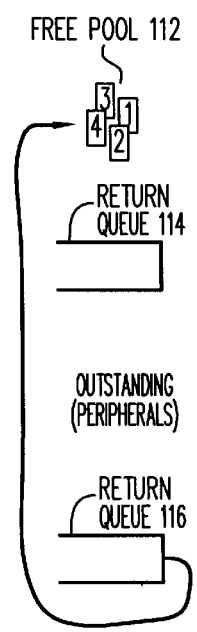
*FIG. 7(c)  FIG. 7(d)  FIG. 7(e)  FIG. 7(f)  FIG. 7(g)*

NON-BLOCKING LOAD BUFFER AND A MULTIPLE-PRIORITY MEMORY SYSTEM FOR REAL-TIME MULTIPROCESSING

FIELD OF THE INVENTION

The present invention relates to interfacing between a microprocessor, peripherals and/or memories. More particularly, the present invention relates to a data processing system for interfacing a high-speed data bus, which is connected to one or more processors and a cache, to a second, possibly lower speed peripheral bus, which is connected to a plurality of peripherals and memories, by a non-blocking load buffer so that a continuous maximum throughput from multiple I/O devices is provided via programmed I/O (memory-mapped I/O) of the processors and a plurality of non-blocking loads may be simultaneously performed. Also, the present invention is directed to a multiple-priority non-blocking load buffer which serves a multiprocessor for running real-time processes of varying deadlines by priority-based non-FIFO scheduling of memory and peripheral accesses.

BACKGROUND OF THE INVENTION

Conventionally, microprocessor and memory system applications retrieve data from relatively low bandwidth I/O devices, process the data by a processor and then store the processed data to the low bandwidth I/O devices. In typical microprocessor memory system applications, a processor and a cache are directly coupled by a bus to a plurality of peripherals such as I/O devices and memory devices. However, the processor may be unnecessarily idled due to the latency between the I/O devices and the processor, thus causing the processor to stall and, as a result, excessive time is required to complete tasks.

In known processing systems, when an operation is performed on one of the peripherals such as a memory device, the time between performing such an operation and subsequent operations is dependent upon the latency period of the memory device. Thereby, the processor will be stalled during the entire duration of the memory transaction. One solution for improving the processing speed of known processing systems is to perform additional operations during the time of the latency period as long as there is no load-use dependency upon the additional operations. For example, if data is loaded into a first register by a first operation (1), where the first operation (1) corresponds to:

$$\text{load } r1 \leftarrow [r2] \tag{1}$$

and the first register is added to another operation by a second operation (2) where the second operation (2) corresponds to:

$$\text{add } r3 \leftarrow r1 + r4 \tag{2}$$

the operation (2) is load-use dependent and the operation (2) must wait for the latency period before being performed. FIGS. 1(a) and 1(b) illustrate a load-use dependent operation where the time for initiating the operation (2) must wait until the operation (1) is completed. Operation (2) is dependent upon the short latency period $t_1$ in FIG. 1(a) corresponding to a fast memory and the long latency period $t_2$ in FIG. 1(b) corresponds to a slower memory.

A non-blocking cache and a non-blocking processor are known where a load operation is performed and additional operations other than loads may be subsequently performed during the latency period as long as the operation is not dependent upon the initial load operation. FIGS. 2(a) and 2(b) illustrate such operations. In operation (1), the first register is loaded. Next, operations (1.1) and (1.2) are to be executed. As long as operations (1.1) and (1.2) are not load dependent on another load, these operations may be performed during the latency period $t_2$ as illustrated in FIG. 2(a). However, if operation (1.1) is either load-dependent or a pending load, operations (1.1) and (1.2) must wait until the latency period $t_2$ ends before being performed.

Also known is a Stall-On-Use (Hit Under Miss) operation for achieving cache miss optimizations as described in "A 200 MFLOP Precision Architecture Processor" at Hot Chips IV, 1993, William Jaffe et al. In this Hit Under Miss operation, when one miss is outstanding only certain other types of instructions may be executed before the system stalls. For example, during the handling of a load miss, execution proceeds until the target register is needed as an operand for another instruction or until another load miss occurs. However, this system is not capable of handling two misses being outstanding at the same time. For a store miss, execution proceeds until a load or sub-word store occurs to the missing line.

This Hit Under Miss feature can improve the runtime performance of general-purpose computing applications. Examples of programs that benefit from the Hit Under Miss feature are SPEC benchmarks, SPICE circuit simulators and gcc C compilers. However, the Hit Under Miss feature does not sufficiently meet the high I/O bandwidth requirements for digital signal processing applications such as digital video, audio and RF processing.

Known microprocessor and memory system applications use real-time processes which are programs having deadlines corresponding to times where data processing must be completed. For example, an audio waveform device driver process must supply audio samples at regular intervals to the output buffers of the audio device. When the driver software is late in delivering data for an audio waveform device driver, the generated audio may be interrupted by objectionable noises due to an output buffer underflowing.

In order to analyze whether or not a real-time process can meet its deadlines under all conditions requires predictability of the worst-case performance of the real-time processing program. However, the sensitivity of the real-time processing program to its input data or its environment makes it impractical in many cases to exhaustively check the behavior of the process under all conditions. Therefore, the programmer must rely on some combination of analysis and empirical tests to verify that the real-time process will complete in the requisite time. The goals of real-time processing tend to be incompatible with computing platforms that have memory or peripheral systems in which the latency of the transactions is unpredictable because an analysis of whether the real-time deadlines can be met may not be possible or worst-case assumptions of memory performance are required. For example, performance estimates can be made by assuming that every memory transaction takes the maximum possible time. However, such an assumption may be so pessimistic that any useful estimate for the upper bound on the execution time of a real-time task cannot be made. Furthermore, even if the estimates are only slightly pessimistic, overly conservative decisions will be made for the hardware performance requirements so that a system results that is more expensive than necessary.

Also, it is especially difficult to reliably predict real-time processing performance on known multiprocessors because the memory and peripherals are not typically multi-ported. Therefore simultaneous access by two or more processors to the same memory device must be serialized. Even if a device is capable of handling multiple transactions in parallel, the bus shared by all of the processors may still serialize the transactions to some degree.

If memory requests are handled in a FIFO manner by a known multiprocessor, a memory transaction which arrives slightly later than another memory transaction may take a much longer amount of time to complete since the later arriving memory requests must wait until the earlier memory request is serviced. Due to this sensitivity, very small changes in the memory access patterns of a program can cause large changes in its performance. This situation grows worse as more processors share the same memory. For example, if ten processors attempt to access the same remote memory location simultaneously, the spread in memory latency among the processors might be 10:1 because as many as nine of these memory transactions may be buffered for later handling. In general, it is not possible to predict which of these processors will suffer the higher latencies and which of these processors will receive fast replies to their memory accesses. Very small changes to a program or its input data may cause the program to exhibit slight operation differences which perturb the timing of the memory transactions.

Furthermore, types of memory which exhibit locality effects may exacerbate the above-described situation. For example, accesses to DRAMs are approximately two times faster if executed in page mode. To use page mode, a recent access must have been made to an address in the same memory segment (page). One of the most common access patterns is sequential accesses to consecutive locations in memory. These memory patterns tend to achieve high page locality, thus achieving high throughput and low latency. Known programs which attempt to take advantage of the benefits of page mode may be thwarted when a second program executing on another processor is allowed to interpose memory transactions on a different memory page. For instance, if ten processors, each with its own sequential memory access pattern, attempt to access the same DRAM bank simultaneously and each of the accesses is to a different memory page, the spread and memory latencies between the fastest and slowest responses might be more than 25:1.

The present invention is directed to allowing a high rate of transfer to memory and I/O devices for tasks which have real-time requirements. The present invention is also directed to allowing the system to buffer I/O requests from several processors within a multiprocessor at once with a non-blocking load buffer. Furthermore, the present invention is directed to extending the basic non-blocking load buffer to service a data processing system running real-time processes of varying deadlines by using scheduling of memory and peripheral accesses which is not strictly FIFO scheduling.

SUMMARY OF THE INVENTION

An object of the present invention is to reduce the effect of memory latency by overlapping a plurality of non-blocking loads during the latency period and to achieve a similar reduction on the effect of latency for non-blocking stores without requiring the additional temporary storage memory of a separate store buffer.

Another object of the present invention is to provide a non-blocking load buffer which buffers I/O requests from one or more processors within a multiprocessor so that a plurality of I/O memory transactions, such as loads and stores, may be simultaneously performed and the high I/O bandwidth requirements for digital signal processing applications may be met.

A still further object of the present invention is to provide a multiple-priority non-blocking load buffer for serving a multiprocessor running real-time processes of varying deadlines by using a priority-based method to schedule memory and peripheral accesses.

The objects of the present invention are fulfilled by providing a data processing system comprising a first data bus for transferring data requests at a first speed, a second bus for transmitting I/O data of a second speed, and a non-blocking load buffer connected to the first and second data buses for holding the data requests and the I/O data so that a plurality of loads and stores may be performed simultaneously. It is possible for the speed of the second bus to be slower than the first speed of the first bus. As a result, data may be retrieved from relatively low bandwidth I/O devices and the retrieved data may be processed and stored to low bandwidth I/O devices without idling the system unnecessarily.

In a further embodiment for a data processing system of the present invention, the first data bus is connected to a processor and the second data bus is connected to a plurality of peripherals and memories. The data processing system for this embodiment reduces the effect of latency of the peripherals and memories so that the application code, which uses programmed I/O, may meet its real-time constraints. Furthermore, the code may have reduced instruction scheduling constraints and a near maximum throughput may be achieved from the I/O devices of varying speeds.

Another embodiment of the present invention is fulfilled by providing a non-blocking load buffer comprising a memory array for temporarily storing data, and a control block for simultaneously performing a plurality of data loads and stores. The non-blocking load buffer for this embodiment allows I/O requests from several processors to be performed at once.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 7(a) and 7(b) illustrate examples of the possible states for a non-blocking load through the memory of the data processing system for an embodiment of the present invention;

FIGS. 7(c), 7(d), 7(e), 7(f), and 7(g) illustrate the progress of addresses through queues of the data processing system in an embodiment of the present invention;

DETAILED DESCRIPTION OF THE PREFERRED EMBODIMENTS

Figure 4:
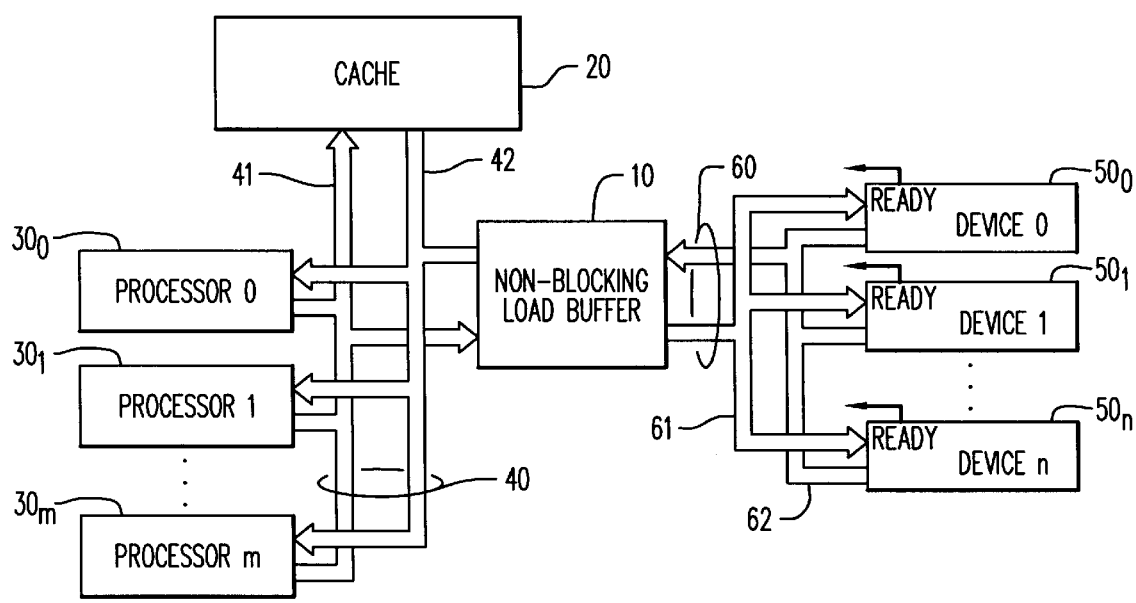
FIG. 4 illustrates a block diagram for the data processing system according to one embodiment of the present invention.

The first embodiment of the present invention will be discussed with reference to FIG. 4. The data processing system includes a non-blocking load buffer 10, a cache 20, one or more processors $30_0, 30_1, \ldots, 30_m$, a processor/cache bus 40 for connecting the non-blocking load buffer 10, the cache 20 and the processors $30_{0..m}$, a plurality of peripheral devices $50_0, 50_1, \ldots, 50_n$, and a peripheral bus 60, which includes an output bus 61 and an input bus 62, for connecting the non-blocking load buffer 10 with the plurality of peripheral devices $50_{0..n}$. Some or all of the peripheral devices $50_{0..n}$ may be memories, such as DRAM for example, which serve as a backing store for the cache 20 or as memory which the processors $30_{0..m}$ access directly through the non-blocking load buffer 10, thus bypassing the cache 20.

The processor/cache bus 40, which includes an input bus 41 and an output bus 42, transfers data from the cache 20 to registers of the processors $30_{0..m}$ as loads via the output bus 42 or alternatively, from the registers of the processors $30_{0..m}$ to the cache 20 as stores via the input bus 41. All I/O operations, which are programmed I/O, and any memory operations, even those which bypass the cache 20, are transmitted over the processor/cache bus 40 as well. For such operations the source or sink of the data is one of the peripheral devices $50_{0..n}$, such as a DRAM, for example.

The bandwidth of the peripheral bus 60 should be chosen to meet the peak input or output bandwidth which is to be expected by the peripheral devices $50_{0..n}$. The bandwidth of the non-blocking load buffer 10 should therefore be chosen to at least equal the sum of the bandwidth of the processor/cache bus 40 and the bandwidth of the peripheral bus 60.

Figure 1A:
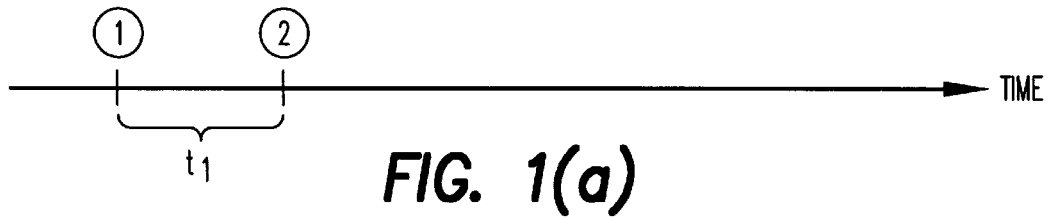
FIGS. 1(a) and 1(b) illustrate time dependency in a conventional load use operation.
Figure 1B:
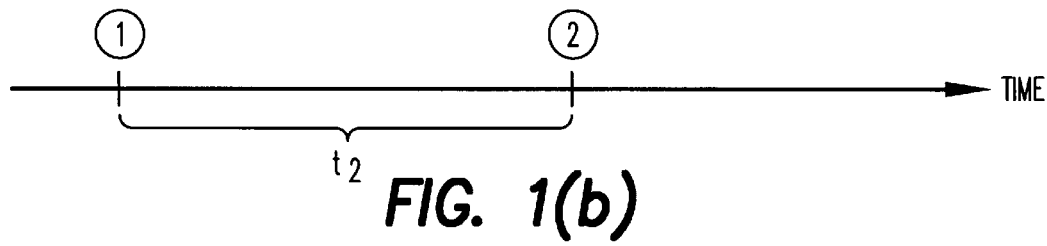
Figure 2A:
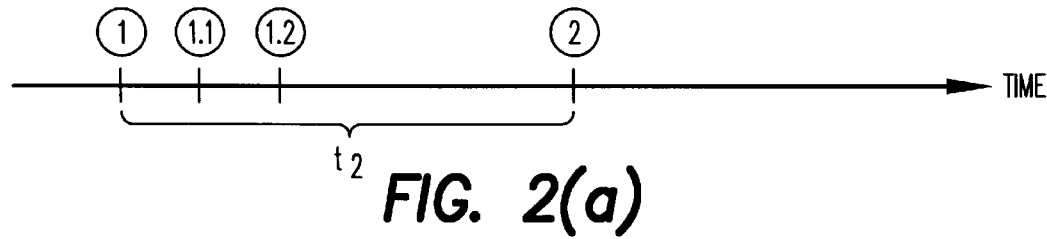
FIGS. 2(a) and 2(b) illustrate time dependency in a known Stall-On-Use operation.
Figure 2B:
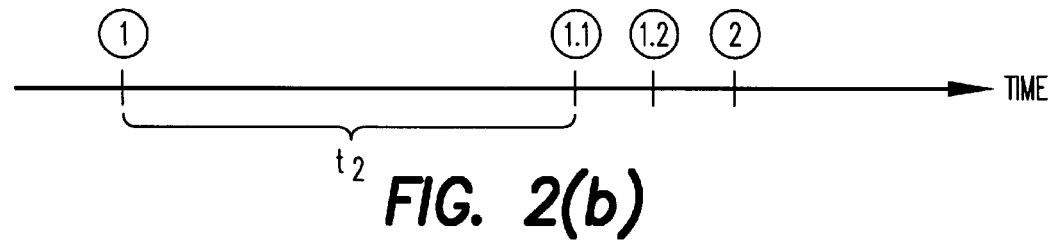
Figure 2C:
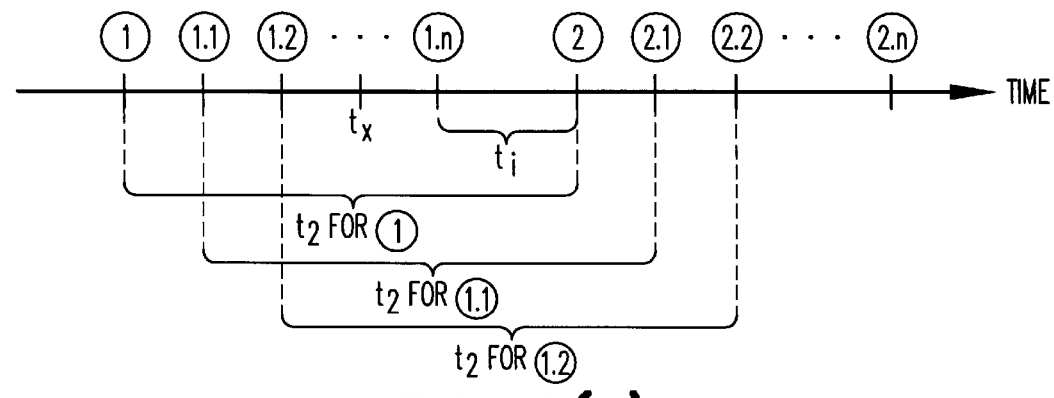
FIG. 2(c) illustrates time dependency in a non-blocking load buffer for an embodiment of the present invention.

The processors $30_{0..m}$ may be designed with dependency-checking logic so that they will only stall when data requested by a previously executed load instruction has not yet arrived and that data is required as a source operand in a subsequent instruction. FIG. 2(c) illustrates the time dependency for the non-blocking load buffer 10 in an embodiment of the present invention. In FIG. 2(c), load instructions are executed at operations (1), (1.1), (1.2), . . . (1.n). In this example, operations (1), (1.1), (1.2), . . . (1.n) correspond to:

load r1←[r2](1);

load r5←[r2+24](1.1);

load r6←[r2+32](1.2);

. . . function z1 (1.n)

In this example, operation (2) executes an instruction dependent on operation (1), operation (2.1) executes an instruction dependent on operation (1.1), operation (2.2) executes an instruction dependent on operation (1.2), . . . operation (2.n) executes an instruction dependent on operation (1.n). For instance, operations (2.1), (2.2), . . . (2.n) correspond to:

add r3←r1+r4(2);

add r7←r5+r4(2.1);

add r8←r6+r4(2.2);

. . . function z2(2.n).

n may be any positive integer. Operations (1.1), (1.2), . . . (1.n) occur as fast as possible and the time between these operations is dependent upon the processor cycle for each operation. As shown in FIG. 2(c), operation (2) waits only for a part of the latency period $t_2$ between operations (1) and (2), which is represented by $t_i$, since the part of the latency period $t_2$ between operations (1) and (2) is overlapped with the operations (1.1), (1.2), . . . (1.n). Thereafter, operations (2.1) and (2.2) occur as fast as possible after operation (2) with the time limitation being the processor cycle. The operations (2.1) and (2.2) do not wait for the full latency period $t_2$ of operation (1.1) since the latency period $t_2$ is partially overlapped with operations (1.1), (1.2), . . . (1.n) and the latency period $t_2$ for operation (1). For values of n sufficiently large, $t_i$ may effectively be reduced to zero and the processor will not suffer any stalls due to memory or I/O latency. In this embodiment, there may be more than one outstanding load to slower memories or peripherals, as shown at instant $t_x$ in FIG. 2(c) for example, and requests may thereby be pipelined to provide continuous maximum throughput from the plurality of peripheral devices $50_{0..n}$ from programmed I/O of the processor.

The non-blocking load buffer 10 may accept both load and store requests from the processors $30_{0..m}$ to the peripheral devices $50_{0..n}$. The non-blocking load buffer 10 may accept requests at the maximum rate issued by a processor for a period of time that is limited by the amount of intrinsic storage in the non-blocking load buffer 10. After accepting requests, the non-blocking load buffer 10 then forwards the requests to the peripheral devices $50_{0..n}$ at a rate which the peripheral devices $50_{0..n}$ may process them. However, the non-blocking load buffer 10 does not have to wait until all of the requests are accepted.

Figure 5:
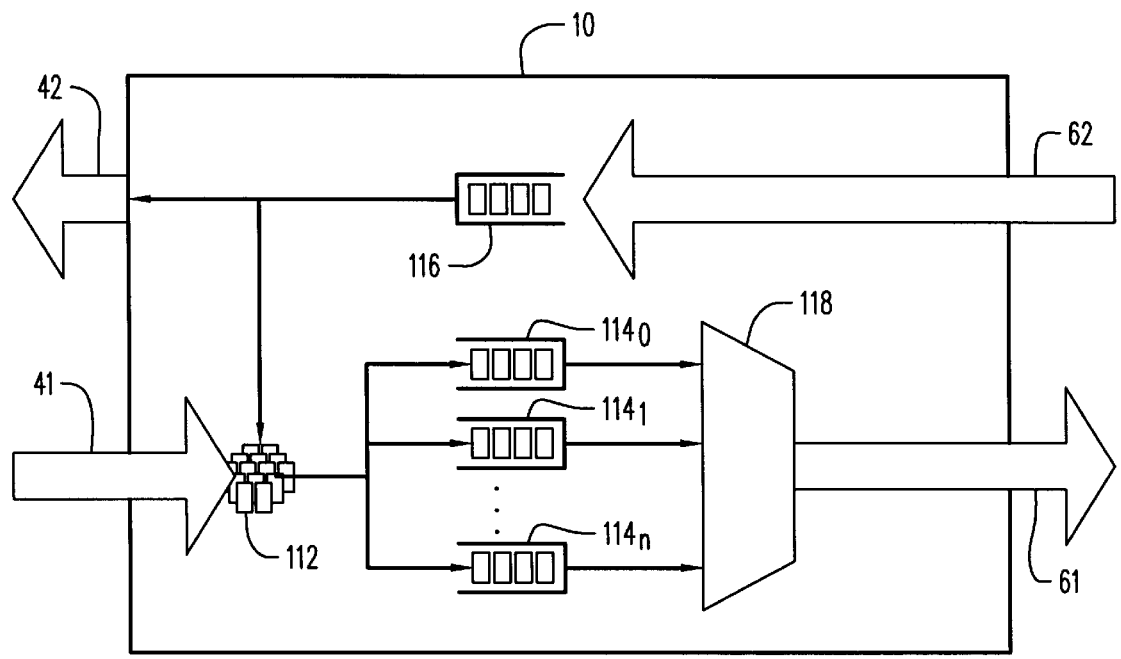
FIG. 5 is a schematic illustration of the non-blocking load buffer for an embodiment of the present invention.

FIG. 5 illustrates internal architecture for the non-blocking load buffer in an embodiment of the present invention. The internal architecture of the non-blocking load buffer 10 includes a plurality of variable-length pending queus $114_0, 114_1, \ldots 114_n$ which contain entries that represent the state of requests made by the processors $30_{0..m}$ to the peripheral devices $50_{0..n}$. The pending queues $114_{0..n}$ correspond to each of the peripheral devices $50_{0..n}$ and are used to hold the address and control information for a load or a store before being transmitted to the corresponding peripheral device. If an entry in the pending queues $114_{0..n}$ contains a store transaction, then that entry will also contain the data to be written to the corresponding peripheral device. Another component of the non-blocking load buffer 10 is a variable-length return queue 116 used to buffer the data returned by any of the peripheral devices $50_{0..n}$ in response to a load until the data can be transmitted to the requesting processor. In addition, there is a free pool 112 that contains any unused request entries. Once a load request is sent from one of the pending queues $114_{0..n}$ to its corresponding peripheral device, the load request is marked as "outstanding" until a return data value is sent by the peripheral and enqueued in the return queue 116. At any time, a given request entry is either outstanding, in one of the pending queues $114_{0..n}$, in the return queue 116, or is not in use and is therefore located in the free pool 112.

Figure 6:
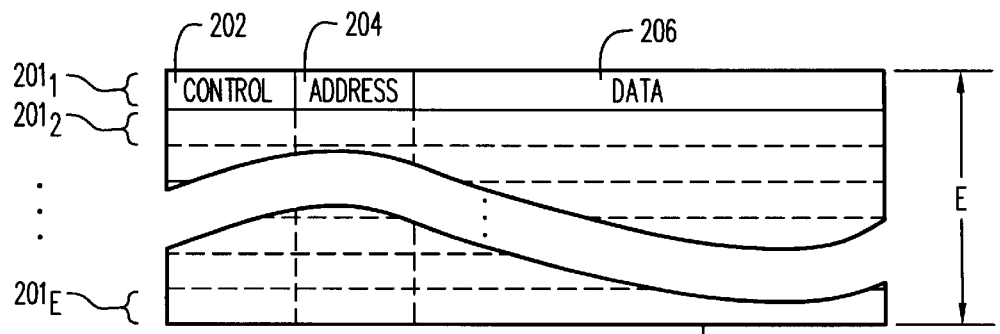
FIG. 6 illustrates an example of the contents for the entries in the memory of the data processing system for an embodiment of the present invention.

FIG. 6 illustrates an example of a memory structure 200 for storing the information present in each entry of the non-blocking load buffer 10. E entries may be stored in the non-blocking load buffer 10 and each entry holds one of a plurality of requests $201_1$, $201_2$, ... $201_E$ which can either be a load or a store to any of the peripheral devices $50_{0..n}$. Each request 201 includes a control information 202, an address 204 and data 206. However, for a load operation, the data 206 is empty until data returns from the peripheral devices $50_{0..n}$. The control information 202 describes parameters such as whether the transaction is a load or a store, the size of data transferred, and a coherency flag that indicates whether all previous transactions must have been satisfied before the new transaction is permitted to be forwarded to the addressed peripheral device. The coherency flag enforces sequential consistency, which is occasionally a requirement for some I/O or memory operations. The data stored in the entries 201 need not be transferred among the queues of the non-blocking load buffer 10. Rather pointers to individual entries within the memory structure 200 may be exchanged between the pending queues $114_{0..n}$, the return queue 116 and the free pool 112 for example.

FIGS. 7(a) and 7(b) illustrate examples of the operation of the non-blocking load buffer 10 which will be input to a peripheral device such as a RAM. Initially, all entries of the non-blocking load buffer 10 are unused and free. With reference to FIG. 7(a), when one of the processors $30_{0..m}$ issues a non-blocking load, a free entry is chosen and the address of the load is stored in this entry. Additionally, space for the returning data is allocated. This entry now enters the pending queue, one of the queues $114_{0..n}$, corresponding to the addressed peripheral device. When the peripheral device is ready, the pending entry is delivered over the peripheral bus 60 and becomes an outstanding entry. When the outstanding entry returns from the peripheral device via the peripheral bus 60, the accompanying requested load data is written to the part of the entry that had been allocated for the returning data and the entry is placed in the return queue 116. The data is buffered until the one processor is ready to receive the data over the processor/cache bus 40 (i.e., until the one processor is not using any required cache or register file write ports). Finally, the data is read out and returned to the one processor over the processor/cache bus 40 and the entry again becomes free. In addition, a peripheral device may accept multiple requests before returning a response.

FIG. 7(b) illustrates the progress of an entry during a store operation. The store operation is similar to the load operation but differs because data does not need to be returned to the processors $30_{0..m}$ and this return step is, therefore, skipped. Once a store is accepted by the non-blocking load buffer 10, the store is treated by the issuing processor as if the data has already been transferred to the target peripheral device, one of the peripheral devices $50_{0..n}$.

The non-blocking load buffer 10 performs similarly to a rate-matching FIFO but differs in several ways. For instance, one difference is that although memory transactions forwarded by the non-blocking load buffer 10 are issued to any particular peripheral device $50_{0..n}$ in the same order that they were requested by any of the processors $30_{0..m}$, the transactions are not necessarily FIFO among different peripheral devices. This is similar to having a separate rate-matching FIFO for outputting to each of the peripheral devices $50_{0..n}$ except that the storage memory for all the FIFOs is shared and is thereby more efficient. Also, the peripheral devices $50_{0..n}$ are not required to return the results of a load request to the non-blocking load buffer 10 in the same order that the requests were transmitted.

The non-blocking load buffer 10 is capable of keeping all of the peripheral devices $50_{0..n}$ busy because an independent pending queue exists for each of the peripheral devices. A separate flow control signal from each of the peripheral devices indicates that this corresponding peripheral device is ready. Accordingly, a request for a fast peripheral device does not wait behind a request for a slow peripheral device.

FIGS. 7(c), 7(d), 7(e), 7(f) and 7(g) illustrate examples of a non-blocking load progressing through the queues. After the queues are reset, entries 1, 2, 3 and 4 are in the free pool as shown in FIGS. 7(c). A non-blocking load is pending after the entry 1 is written into one of the pending queues as shown in FIG. 7(d). Next, FIG. 7(e) illustrates that entry 1 becomes outstanding after the pending load is accepted by its corresponding peripheral device. Subsequently, the load is returned from the peripheral device and entry 1 is now in the returned queue as illustrated in FIG. 7(f), and awaits transmission to the requesting processor (or to the cache if the access was part of a cache fill request). Finally, in FIG. 7(g), entry 1 is released to the free pool and, once again, all entries are free.

Figure 8:
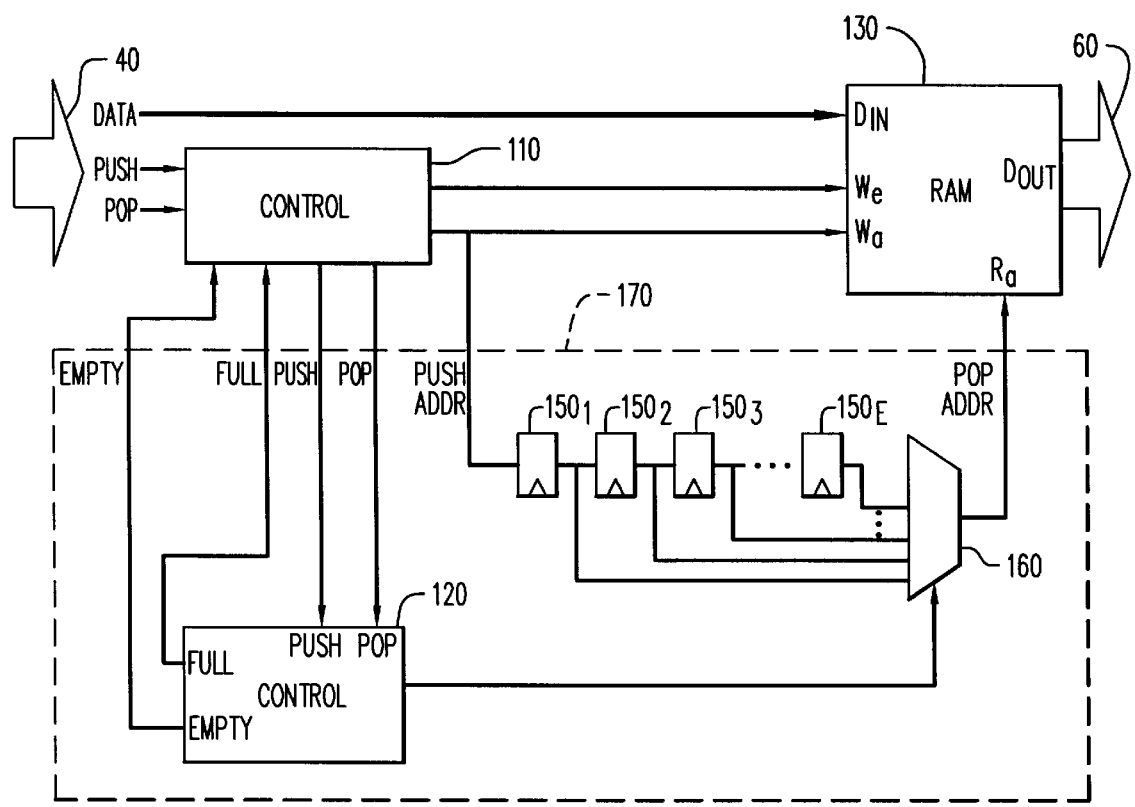
FIG. 8 illustrates the circuitry used for the non-blocking load buffer in an embodiment of the present invention.

FIG. 8 illustrates the circuitry used for the non-blocking load buffer in an embodiment of the present invention which implements variable depth FIFOs. This circuitry manipulates pointers (i.e. RAM addresses for example) to entries in a RAM 130 instead of storing the addresses of only the head and tail of a contiguous list of entries in the RAM 130. Furthermore, the circuitry does not require the pointers to be sequential. Therefore, records need not be contiguous and the RAM 130 can contain several interleaved data structures allowing more flexible allocation and de-allocation of entries within a FIFO so that it is possible to use the same storage RAM 130 for multiple FIFOs. The entire circuit in FIG. 8 represents a large FIFO of an unspecified data width which is controlled by a smaller FIFO represented by block 170 having pointer widths smaller than the records. In FIG. 8, a first control circuit 110, a second control circuit 120, the RAM 130 having separate read and write ports, a plurality of shift registers $150_1$, $150_2$, $150_3$, ... $150_n$ corresponding to each entry in the RAM 130 and a multiplexer 160 are illustrated. The control circuits 110 and 120 provide pointers to the entries of the RAM 130 rather than the entries themselves being queued. Block 170 is essentially a FIFO of pointers. A pointer may be enqueued in the FIFO of pointers in block 170 by asserting the "push" control line active and placing the pointer (SRAM 130 address) on the "push-addr" input lines to block 170. Similarly, a pointer value may be dequeued by asserting the "pop" control line on block 170 with the pointer value appearing on the "pop-addr" bus. Block 170 has a "full" output that when active indicates that no more pointers may be enqueued because all the registers $150_{1..p}$ are occupied and the queue is at its maximum depth, p. Block 170 also has an "empty" output that indicates when no pointers remain enqueued.

In a preferred embodiment, the RAM 130 is divided into two arrays, an address control array AC and a data array D.

The address control array AC stores the control information 202 and the address 204 for each entry and the data array D stores the data 206 for each entry. Dividing the non-blocking load buffer into these two arrays AC and D realizes a more efficient chip layout than using a single array for both purposes.

Figure 10:
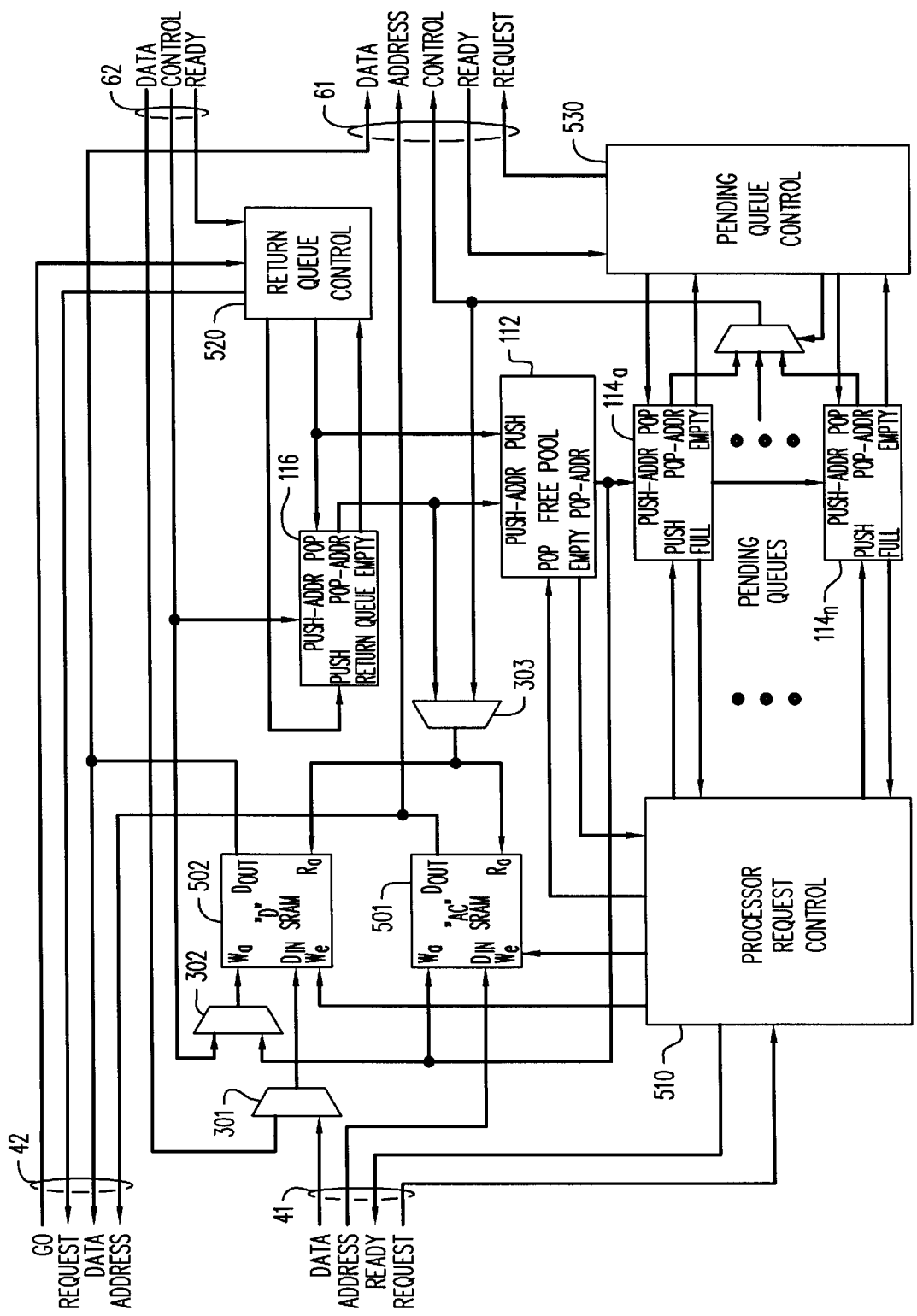
FIG. 10 illustrates a detailed block diagram of an embodiment of the non-blocking load buffer.

FIG. 10 illustrates the entire structure for a non-blocking load buffer in an embodiment of the present invention. Each of the pending queues $114_{0..n}$ and the return queue 116 may be composed of copies of block 170 illustrated in FIG. 8 for example. The queue entries are stored in the AC and D arrays 501 and 502, with pointers to the array locations in the flip-flops that compose the pending queues $114_{0..n}$, the return queue 116 and the free pool 112. For the embodiment illustrated in FIG. 10, the write ports to the AC and D arrays are time-division multiplexed using multiplexers 301 and 302 to allow multiple concurrent accesses from the processors $30_{0..m}$, which issue load and store requests over bus 41, and the peripheral devices $50_{0..n}$, which return requested load data over bus 62. Similarly, the read ports are time-division multiplexed by multiplexer 303 between returning load data going back to the processors $30_{0..m}$ via bus 42 and issuing of load and store requests to the peripherals $50_{0..n}$ via bus 61. A processor request control unit 510 accepts the load and store requests from the processors $30_{0..m}$, a return queue control unit 520 controls the data returned by the peripheral devices $50_{0..n}$ to the return queue 116 and a pending queue control unit 530 controls the selection of the pending queue $114_{0..n}$.

Figure 3A:
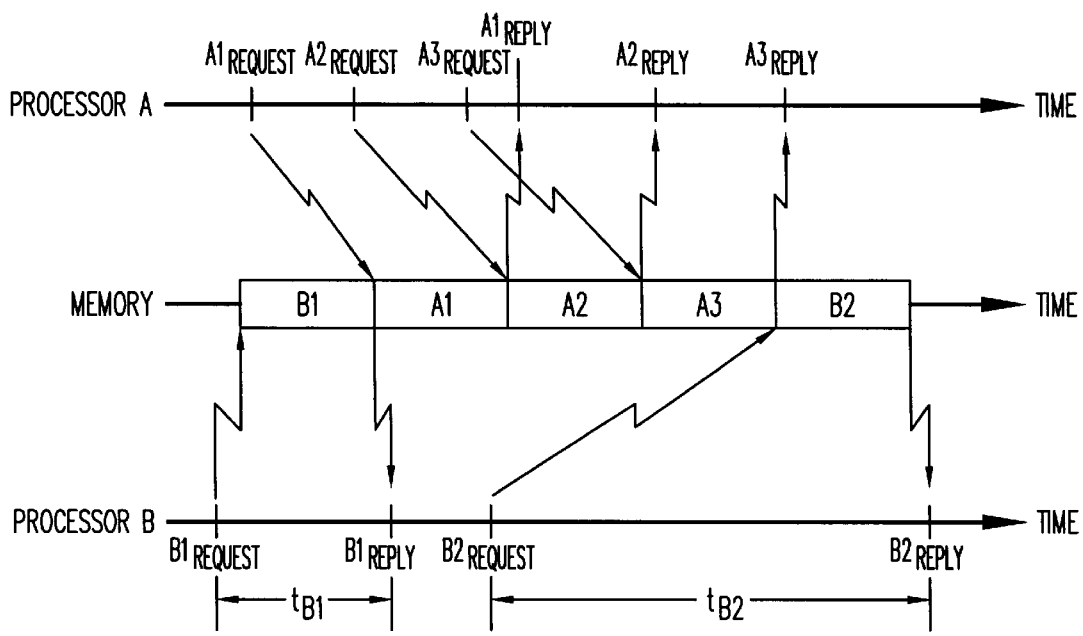
FIG. 3(a) illustrates unpredictable memory latency in a known multiprocessor system.

When either a non-blocking load buffer or a conventional single FIFO load buffering operation is used, the uncertainty and memory latency is further request at a time as illustrated in FIG. 3(a) for example. In FIG. 3(a), processor A issues three non-blocking loads to a memory device after a first non-blocking load is issued by processor B but before a second non-blocking load is issued by processor B to the same memory device. The first memory transaction issued by processor B, labeled B1, will be executed immediately. However, the latency of the second transaction, labeled B2, by processor B, $t_{B2}$, will be considerably longer than the latency of the first transaction, $t_{B1}$, since the second transaction B2 will not be handled by the memory system until all of the requests A1, A2, and A3 by processor A have been processed.

One consideration for overcoming all of these unpredictable memory latency effects is to have the programmer carefully design the times at which each real-time process attempts to access the memory which effectively has software serialize access to the memory banks instead of hardware. For instance, two processors may alternate memory accesses at regular intervals to match the throughput capabilities of the memory system. However, such programming places a heavy burden on both the program and the programmer because the programmer must be aware of the detailed temporal behavior of the memory access patterns by the program. The behavior of the programs is usually very complex and may change based on its input data, which is not always known. Therefore, it is impractical for the programmer to know the detailed temporal behavior of the memory access patterns by the program.

Also, because the combinations of processors that are making the requests are even more difficult to predict and the combinations of programs running on the different processors might not always be the same on each occasion or even known, the detailed temporal behavior of the memory access patterns by the program may not be known. For example, two processes that run two different programs on two different processors may have been written by different programmers and the source code may not even be available for either or both programs. As a result, this programming approach for overcoming the unpredictable memory latency defeats the purpose of using a non-blocking load buffer, which was designed to simplify the burden on the programmer and the compiler by relaxing the scheduling constraints under which memory operations can be issued while still permitting efficient utilization of the processor.

Figure 9A:
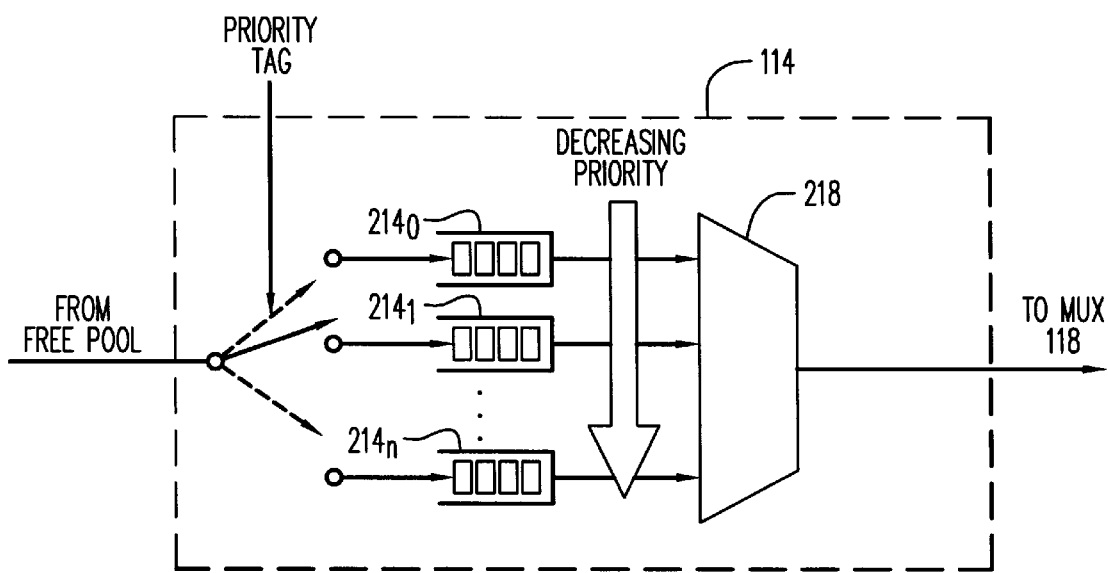
FIGS. 9(a) and 9(b) illustrate parallel pending queues which allow prioritization of data in the data processing system for an embodiment of the present invention.
Figure 9B:
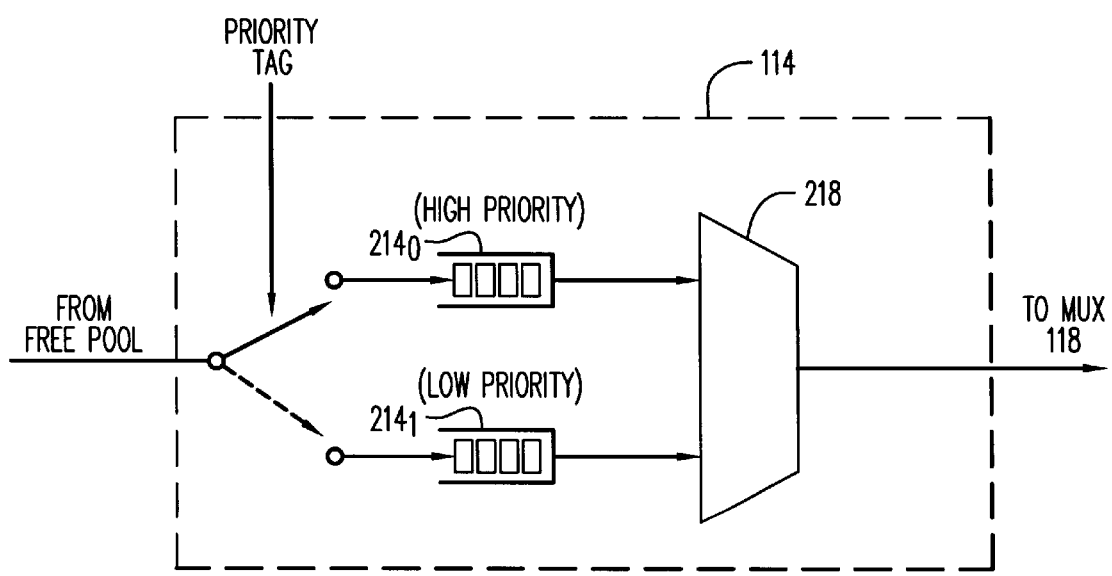

FIG. 9(a) illustrates another embodiment of the present invention for a multiple-priority version of the non-blocking load buffer. In this embodiment, the non-blocking load buffer is a variation of the basic non-blocking load buffer where multiple pending sub-queues $214_0, 214_1, \ldots 214_p$ exist as a component of each pending queue $114_{0..n}$. The outputs of the sub-queues $214_{0..p}$ are then input to the sub-multiplexers 218 associated with one of the peripheral devices. Each output of the sub-multiplexers 218 are then input to the main multiplexer 118. Each of these pending sub-queues is assigned a unique priority level. In the simplest implementation of this multiple-priority version of the non-blocking load buffer, illustrated in FIG. 9(b), there are two pending sub-queues $214_0$ and $214_1$ for a peripheral device with sub-queue $214_0$ being assigned a high priority and sub-queue $214_1$ assigned a low priority. The multiple-priority non-blocking load buffer issues memory or peripheral transactions in a highest-priority-first manner. In other words, no transaction will be issued from a pending sub-queue for a given peripheral unless all of the higher priority sub-queues for that same peripheral are empty. For each peripheral device, requests are issued from the pending sub-queue in a FIFO manner for memory transactions of the same priority.

The computational processes associated with the memory transactions that take place at each of these relative priority levels execute on the processors $30_{0..m}$. The priority levels are assigned by the processors based on the scheduling parameters of all the processes in the system. The priority level of the process is designed to reflect the relative importance of the memory accesses with respect to allowing all of the processes to meet their deadlines if possible. The priority levels may also be applicable in a uni-processor environment. For example, interrupt handlers may be provided to achieve low latency by using higher priority memory transactions than the transaction being interrupted. The priority level may be identified by adding a priority tag to the memory transaction. This priority tag is used to channel the memory transaction into the pending sub-queue with the matching priority level, thus the selection of the appropriate destination pending sub-queue for a non-blocking memory transaction is a function of both the address and the priority level of the access. The priority tag may be stored with the other control information 202 in the queue entry 201 corresponding to a given non-blocking memory access.

Figure 11:
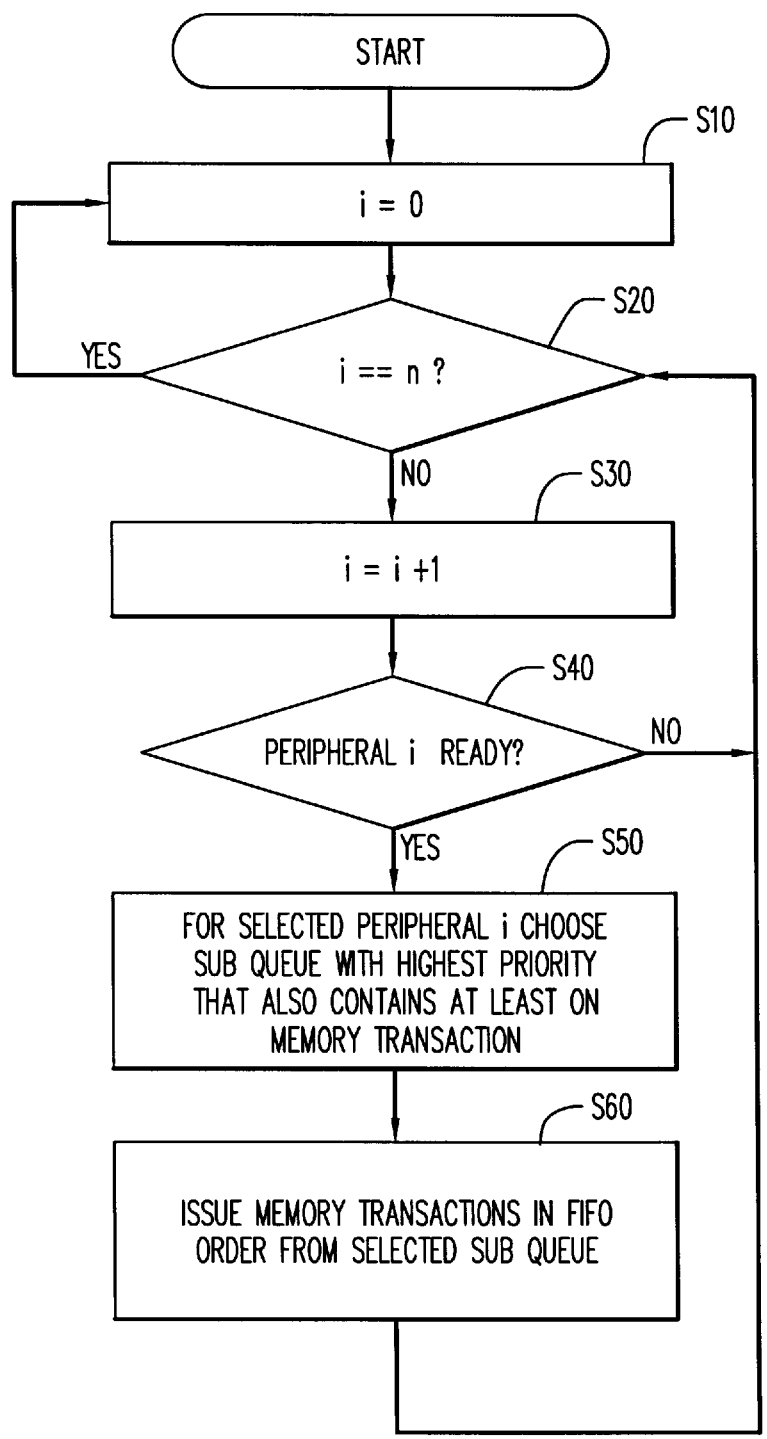
FIG. 11 illustrates a flow chart of the control of the pending queue in an embodiment of the present invention.

FIG. 11 illustrates a flow chart for the functions performed by the pending queue control unit in an embodiment of the present invention for the multiple-priority version of the non-blocking load buffer. At step S10, the counter i for a pending queue is initialized to zero. At step S20, the counter is compared to the number n of pending queues 114. If the counter is not equal to the total number of pending queues, the counter is incremented at step S30 and a determination is made at step S40 of whether the peripheral corresponding to the counter is ready. If the peripheral device is determined not to be ready at step S40, the process returns to step S20. However, if the peripheral corresponding to the counter is ready at step S40, a pending queue is selected at step S50 with the highest priority that also contains at least one memory transaction. At step S60, memory transactions are issued in a FIFO order from the selected sub-queue and the process returns to step S20. If the counter is equal to the number of pending queues at S20, the process has been completed for all the pending queues and step S10 is returned to where the counter is initialized.

Figure 3B:
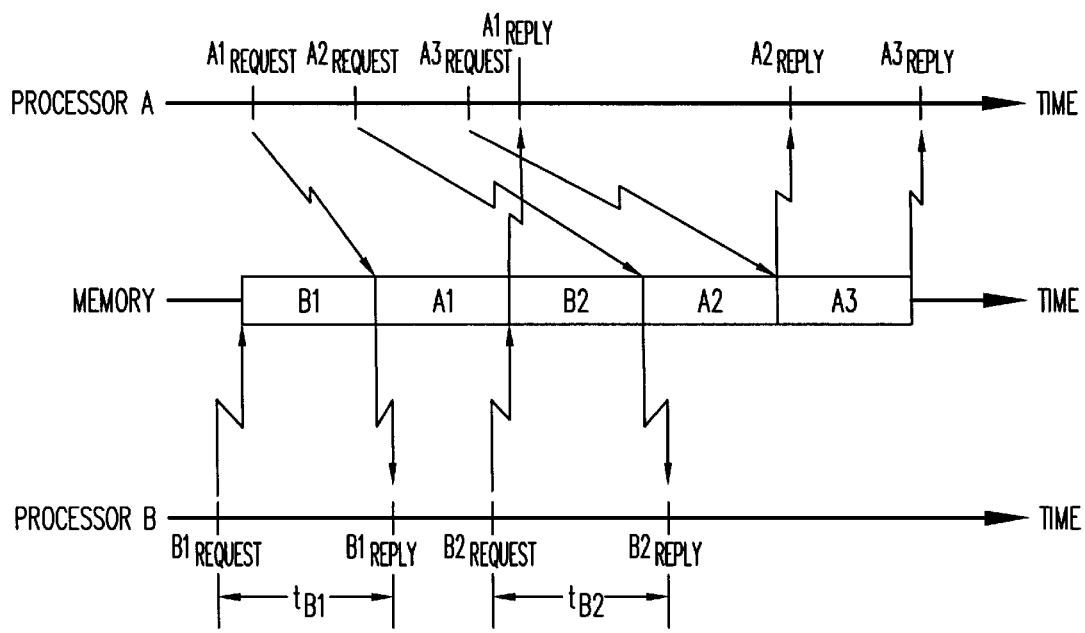
FIG. 3(b) illustrates memory latency in a multiprocessor system having a multiple-priority version of the non-blocking load buffer.

FIG. 3(b) illustrates memory latency for the multiple-priority non-blocking load buffer. In this example, processor B's memory transactions are assigned a higher priority than processor A's memory transactions. Therefore, transaction B2 is delivered to the memory before transactions A2 and A3 even though the request to begin transaction B2 arrived at the non-blocking load buffer after requests A2 and A3. As a result, the latency for transaction B2, $t_{B2}$ is less in FIG. 3(b) than $t_{B2}$ in FIG. 3(a), which illustrates a non-blocking load buffer that does not offer the benefit of multiple-priority scheduling. Using the multiple-priority version of the non-blocking load buffer, Processor B spends less time stalled waiting for transaction B2 to complete as illustrated by the comparison in FIGS. 3(a) and 3(b).

These priority levels may be heuristic in nature. For example, if using earliest deadline first (EDF) scheduling, a process should not be assigned a lower priority than the priority of any process which has a more distant deadline. In general, this priority level is not necessarily fixed for each process and the priority level may vary over time as the demands of the real-time process or of other processes change. As another example of a priority selection mechanism, if the load-use distance is known for a load instruction (as computed by a compiler), it can be used to set a priority for each individual memory access instruction. (Higher load-use distances result in lower priorities.) In general, non real-time processes (the processes having no deadlines) are typically given the lowest priority.

Process priority may also be used to arbitrate for the limited resources within the non-blocking load buffer itself. For example, in one embodiment of the non-blocking load buffer, limited data storage memory is shared among all peripheral devices and processors. When the total number of slots among all of the non-blocking load buffer queues exceeds the number of non-blocking memory entries, it is possible for a process at a low priority to prevent a higher priority process from completely utilizing one or more of its pending sub-queues by using up these entries. The use of priority in allocating non-blocking memory entries can be used to eliminate this effect. For example, the maximum number of outstanding non-blocking memory transactions may be specified for each of the available priorities.

Once an appropriate priority has been determined for a process, the priority of its memory transactions might be specified to the non-blocking load buffer by employing any of several techniques. For example, the priority of any given memory transaction might be determined by an operand to the instruction that performs the memory access or the priority can be associated with certain bit combinations in either the virtual address, the physical address of the memory or the physical address of the peripheral device accessed. Alternatively, the processors might be designed with programmable registers that set the priority of all memory accesses for each processor. Yet another possible technique is to store the memory access priority in the page table of a virtual memory system and thus make the memory access priority a characteristic of specific memory pages. When these various techniques are combined with conventional memory management and processor design techniques, memory priorities can be treated as privileged resources. As a result, the operating system reserves the highest priority levels for its own real-time tasks and therefore the user level programs are extremely limited in their ability to disrupt important system real-time tasks.

To maintain memory coherency in a multiple-priority non-blocking load buffer, which is not always necessary, no load or store may be issued to any of the peripheral devices while a load or store to the same address is outstanding or while an earlier load or store to the same address is pending. The memory coherency may be maintained by time stamps combined with address comparison. However, memory coherency may also be maintained more simply by ensuring that requests of different priorities are sent to non-overlapping address segments within the same peripheral device.

In the normal operation of programmed I/O activity, the processors $30_{0..m}$ do not need to exactly schedule loads to achieve maximum throughput from the peripheral devices but can instead burst out requests to the limits of the non-blocking load storage and, if properly programmed, perform useful work while waiting for data to return. The non-blocking load buffer allows application code to use programmed I/O (memory mapped I/O) for achieving near maximum throughput from the I/O devices of varying speeds which reduces the effective latency of the I/O peripheral devices and relaxes the scheduling constraints on the programmed I/O. The non-blocking load buffer functions to rate-match the requests from the processor to the peripheral devices and back and to act upon the priority of requests from the processor to allow high priority requests to go ahead of low priority requests already buffered.

The non-blocking load buffer uses queues of pointers to centralize storage to increase storage density, parallel queues to implement requests of different priority and memory segment descriptors to determine priority. Accordingly, I/O requests to a fast device need not wait behind requests to a slow device and requests from several processes of a signal processor running multiple processes are buffered so that the processor is not unnecessarily idled and the time to complete tasks is reduced. Because the multiple priority non-blocking load buffer has multiple pending sub-queues for each of the peripherals, a processor used in combination with this multiple priority non-blocking load buffer is able to run real-time processes of varying deadlines by use of non-FIFO scheduling of memory and peripheral accesses. Also, the multiple priority non-blocking load buffer simplifies the burden on the programmer and the compiler by relaxing the scheduling constraints under which memory operations can be issued while still permitting efficient utilization of the processor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data processing system comprising:
   one or more requesting processors that generate processor requests directed to one or more peripheral devices;
   a plurality of peripheral devices that accept the processor requests and
   a controller responsive to the processor requests that creates a plurality of separate pending queues corresponding to each one of the plurality of peripheral devices for queuing the processor requests directed to a particular peripheral device in entries of a corresponding separate pending queue, wherein at least two separate peripheral devices process the processor requests simultaneously, after retrieving such processor requests from their respective separate pending queues, wherein the one or more requesting processors include dependency checking logic that generate non-blocking processor requests.

2. The data processing system according to claim 1, wherein the one or more requesting processors include dependency checking logic that generate non-blocking processor requests.

3. The data processing system according to claim 1, wherein the non-blocking processor requests are generated by running real-time processes.

4. The data processing system according to claim 1, wherein the separate pending queues are prioritized such that the higher priority pending queues have a higher number of maximum entries than the lower priority pending queues.

5. The data processing system according to claim 1, wherein the one or more requesting processors generate the processor requests over a first bus, and wherein the peripheral devices accept the processor requests over a second bus that has a different bus bandwidth from the first bus.

6. The data processing system according to claim 1, wherein the controller marks a processor request as outstanding, when a corresponding peripheral device accepts such processor request.

7. The data processing system according to claim 6, wherein the controller places the processor requests in a return queue, after the peripheral devices respond to such outstanding processor requests.

8. A data processing system comprising:
one or more requesting processors that generate processor requests directed to one or more peripheral devices;
a plurality of peripheral devices that accept the processor requests; and
a controller responsive to the processor requests that creates a plurality of separate pending queues corresponding to each one of the plurality of peripheral devices for queuing the processor requests directed to a particular peripheral device in entries of a corresponding separate pending queue, wherein at least two separate peripheral devices process the processor requests simultaneously, after retrieving such processor requests from their respective separate pending queues;
a shared memory device, wherein the controller generates the pending queues from an allocated free pool of entries on the shared memory device, wherein the controller variably adds entries to the pending queues from the allocated free pool of entries, only after the processor requests are generated; and wherein the entries include pointers that point to memory locations on the shared memory device.

9. The data processing system according to claim 8, wherein the processor requests include control information, addresses and data, and wherein the shared memory device is partitioned for storing the address and control information in a first memory array and for storing the data in a second separate memory array.

10. A data processing system comprising:
one or more requesting processors that generate non-blocking processor requests directed to one or more peripheral devices;
a plurality of peripheral devices that accept the non-blocking processor requests;
a shared memory device; and
a memory controller responsive to the non-blocking processor requests that creates a plurality of separate pending queues on the shared memory device corresponding to each one of the plurality of peripheral devices for queuing the non-blocking processor requests directed to a particular peripheral device in entries of a corresponding separate pending queue, wherein at least two separate peripheral devices process the non-blocking processor requests simultaneously, after retrieving such non-blocking processor requests from their respective separate pending queues, wherein the entries include pointers that point to memory locations on the shared memory device.

11. The data processing system according to claim 10, wherein the one or more requesting processors generate the non-blocking processor requests over a first bus, and wherein the peripheral devices accept the non-blocking processor requests over a second bus that has a different bus bandwidth from the first bus.

12. The data processing system according to claim 10, wherein the non-blocking processor requests are prioritized in the pending queues such that the higher priority non-blocking processor requests are processed before the lower priority non-blocking processor requests.

13. The data processing system according to claim 10, wherein the pending queues are prioritized such that the higher priority pending queues have a higher number of maximum entries than the lower priority pending queues.

14. The data processing system according to claim 10, wherein the memory controller marks a non-blocking processor request as outstanding, when a corresponding peripheral device accepts such non-blocking processor request.

15. The data processing system according to claim 10, wherein the memory controller generates the pending queues from an allocated free pool of entries on the shared memory device.

16. The data processing system according to claim 14, wherein the memory controller places the accepted non-blocking processor requests in a return queue located on the shared memory device, after the peripheral devices respond to such outstanding non-blocking processor requests.

17. The data processing system according to claim 15, wherein the memory controller variably adds entries to the pending queues, only after the non-blocking processor requests are generated.

18. A data processing system comprising:
one or more requesting processors that generate non-blocking processor requests directed to one or more peripheral devices;
a plurality of peripheral devices that accept the non-blocking processor requests;
a shared memory device; and
a memory controller responsive to the non-blocking processor requests that creates a plurality of separate pending queues on the shared memory device corresponding to each one of the plurality of peripheral devices for queuing the non-blocking processor requests directed to a particular peripheral device in entries of a corresponding separate pending queue, wherein at least two separate peripheral devices process the non-blocking processor requests simultaneously, after retrieving such non-blocking processor requests from their respective separate pending queues, wherein the non-blocking processor requests include control information, addresses and data, and wherein the shared memory device is partitioned for storing the address and control information in a first memory array and for storing the data in a second separate memory array.

19. A method for processing data comprising the steps of:
generating processor requests that are directed to a plurality of peripheral devices by one or more requesting processors;
creating a plurality of separate pending queues that correspond to each one of the plurality of peripheral devices, for queuing the processor requests directed to a particular peripheral device in entries of a corresponding pending queue;
processing two separate processor requests directed to corresponding peripheral devices simultaneously, after retrieving such processor requests from their respective separate pending queues;
allocating a shared memory space for entries of the separate pending queues;
freeing the entries of the processor requests in the pending queues, after such processor requests are accepted by the peripheral devices; and
placing the outstanding processor requests in the entries of a return queue on the shared memory space, after the corresponding peripheral devices respond to such outstanding processor requests.

20. The method for processing data according to claim 19 further including performing dependency checking on the processor requests, to generate non-blocking processor requests.

21. The method for processing data according to claim 19 further including prioritizing the processor requests in the pending queues such that the higher priority processor requests are processed before the lower priority processor requests.

22. The method for processing data according to claim 19 further including prioritizing the separate pending queues such that the higher priority pending queues have a higher number of maximum entries than the lower priority pending queues.

23. The method for processing data according to claim 19 further including variably adding entries to the pending queues, only after processor requests directed to corresponding peripheral devices are generated.

24. The method for processing data according to claim 19 further including marking a processor request as outstanding after such processor request is accepted by a corresponding peripheral device.

25. The method for processing data according to claim 20 further including generating the non-blocking processor requests by running real-time processes.

26. A method for processing data comprising the steps of:
generating processor requests that are directed to a plurality of peripheral devices by one or more requesting processors;
creating a plurality of separate pending queues that correspond to each one of the plurality of peripheral devices, for queuing the processor requests directed to a particular peripheral device in entries of a corresponding pending queue;
processing two separate processor requests directed to corresponding peripheral devices simultaneously, after retrieving such processor requests from their respective separate pending queues; and
freeing entries of the processor requests in the return queue, after transmitting corresponding responses from the peripheral devices to the requesting processors.

27. A system for processing data comprising:
means for generating processor requests that are directed to a plurality of peripheral devices by one or more requesting processors;
means for creating a plurality of separate pending queues that correspond to each one of the plurality of peripheral devices, for queuing the processor requests directed to a particular peripheral device in entries of a corresponding pending queue;
means for processing at least two separate processor requests directed to corresponding peripheral devices simultaneously, after retrieving such processor requests from their respective separate pending queues; and
means for freeing entries of the processor requests in the return queue, after transmitting corresponding responses from the peripheral devices to the requesting processors.

28. The method for processing data according to claim 27 further including means for performing dependency checking on the processor request, to generate non-blocking processor requests.

29. The system for processing data according to claim 27 further including means for prioritizing the processor requests in the pending queues such that the higher priority processor requests are processed before the lower priority processor requests.

30. The system for processing data according to claim 27 further including means for prioritizing the separate pending queues such that the higher priority pending queues have a higher number of maximum entries than the lower priority pending queues.

31. The system for processing data according to claim 27 further including means for variably adding entries to the pending queues, only if processor requests directed to corresponding peripheral devices are generated.

32. The system for processing data according to claim 27 further including means for marking a processor request as outstanding after such processor request is accepted by a corresponding peripheral device.

33. The system for processing data according to claim 28 further including means for generating the non-blocking processor requests by running real-time processes.

34. A system for processing data comprising:
means for generating processor requests that are directed to a plurality of peripheral devices by one or more requesting processors;
means for creating a plurality of separate pending queues that correspond to each one of the plurality of peripheral devices, for queuing the processor requests directed to a particular peripheral device in entries of a corresponding pending queue;
means for processing at least two separate processor requests directed to corresponding peripheral devices simultaneously, after retrieving such processor requests from their respective separate pending queues;
means for allocating a shared memory space for entries of the separate pending queues;
means for freeing the entries of the processor requests in the pending queues, after such processor requests are accepted by the peripheral devices; and
means for placing the outstanding processor request in the entries of a return queue on the shared memory space, after the corresponding peripheral devices respond to such outstanding processor requests.

* * * * *

US005812799C1

(12) EX PARTE REEXAMINATION CERTIFICATE (6651st)

United States Patent
Zuravleff et al.

(10) Number: US 5,812,799 C1
(45) Certificate Issued: Feb. 10, 2009

(54) NON-BLOCKING LOAD BUFFER AND A MULTIPLE-PRIORITY MEMORY SYSTEM FOR REAL-TIME MULTIPROCESSING

(75) Inventors: William K. Zuravleff, Mountainview, CA (US); Mark Semmelmeyer, Sunnyvale, CA (US); Timothy Robinson, Boulder Creek, CA (US); Scott Furman, Union City, CA (US)

(73) Assignee: Microunity Systems Engineering, Inc., Sunnyvale, CA (US)

Reexamination Request:
No. 90/008,232, Oct. 27, 2006

Reexamination Certificate for:
Patent No.: 5,812,799
Issued: Sep. 22, 1998
Appl. No.: 08/480,738
Filed: Jun. 7, 1995

(51) Int. Cl.
*G06F 13/42* (2006.01)

(52) U.S. Cl. .................. 710/52; 710/17; 710/18; 710/20; 710/39; 710/40; 710/56
(58) Field of Classification Search .................. 710/5, 710/52, 17, 18, 20, 39; 711/156
See application file for complete search history.

(56) References Cited

U.S. PATENT DOCUMENTS

| 4,527,232 A | 7/1985 | Bechtolsheim |
| 4,796,232 A | 1/1989 | House |
| 4,803,621 A | 2/1989 | Kelly |
| 4,843,543 A | 6/1989 | Isobe |
| 4,899,272 A | 2/1990 | Fung |
| 4,924,375 A | 5/1990 | Fung |
| 4,937,791 A | 6/1990 | Steele |
| 4,943,919 A | 7/1990 | Aslin |
| 5,034,917 A | 7/1991 | Bland |
| 5,168,547 A | 12/1992 | Miller |
| 5,179,667 A | 1/1993 | Iyer |
| 5,197,130 A | 3/1993 | Chen |
| 5,208,914 A | 5/1993 | Wilson |
| 5,253,342 A | 10/1993 | Blount et al. |
| 5,256,994 A | 10/1993 | Langendorf |

(Continued)

FOREIGN PATENT DOCUMENTS

| EP | 0427425 A2 | 5/1991 |
| WO | WO 91/16680 | 10/1991 |

OTHER PUBLICATIONS

U.S. Appl. No. 07/663,314, filed Mar. 1, 1991, Johnson.
U.S. Appl. No. 08/340,740, filed Nov. 16, 1994, Wulf.
*MU v. Dell & Intel* Defendants' Corrected Preliminary Invalidity Contentions and Exhibit H—Claim Chart for the '096 Patent served Jan. 12, 2005 in *MicroUnity Systems Engineering, Inc. v. Dell, Inc., et al.*, 2:04–CV–120(TJW), U.S.D.C., E.D. Texas, Marshall Division.

(Continued)

*Primary Examiner*—Majid Banankhah

(57) ABSTRACT

A non-blocking load buffer for use in a high-speed microprocessor and memory system. The non-blocking load buffer interfaces a high-speed processor/cache bus, which connects a processor and a cache to the non-blocking load buffer, with a lower speed peripheral bus, which connects to peripheral devices. The non-blocking load buffer allows data to be retrieved from relatively low bandwidth peripheral devices directly from programmed I/O of the processor at the maximum rate of the peripherals so that the data may be processed and stored without unnecessarily idling the processor. I/O requests from several processors within a multiprocessor may simultaneously be buffered so that a plurality of non-blocking loads may be processed during the latency period of the device. As a result, a continuous maximum throughput from multiple I/O devices by the programmed I/O of the processor is achieved and the time required for completing tasks and processing data may be reduced. Also, a multiple priority non-blocking load buffer is provided for serving a multiprocessor running real-time processes of varying deadlines by prioritization-based scheduling of memory and peripheral accesses.

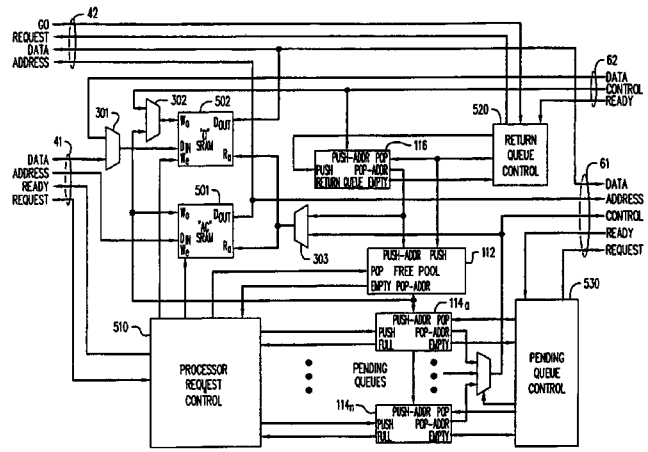

U.S. PATENT DOCUMENTS

| | | | |
|---|---|---|---|
| 5,278,974 | A | 1/1994 | Lemmon |
| 5,287,327 | A | 2/1994 | Takasugi |
| 5,301,278 | A | 4/1994 | Bowater |
| 5,303,364 | A | 4/1994 | Mayer |
| 5,327,570 | A | 7/1994 | Foster |
| 5,371,772 | A | 12/1994 | Al-Khairi |
| 5,375,208 | A | 12/1994 | Pitot |
| 5,416,743 | A | 5/1995 | Allan |
| 5,440,713 | A | 8/1995 | Lin |
| 5,477,181 | A | 12/1995 | Li |
| 5,511,024 | A | 4/1996 | Ware |
| 5,513,327 | A | 4/1996 | Farmwald |
| 5,530,960 | A | 6/1996 | Parks et al. |
| 5,577,236 | A | 11/1996 | Johnson |
| 5,615,355 | A | 3/1997 | Wagner |
| 5,638,534 | A | 6/1997 | Mote |
| 5,666,494 | A | 9/1997 | Mote |
| 5,701,434 | A | 12/1997 | Nakagawa |
| 5,717,639 | A | 2/1998 | Williams |
| 5,732,236 | A | 3/1998 | Nguyen |
| 5,805,912 | A | 9/1998 | Johnson |
| 5,812,829 | A | 9/1998 | Ito |
| 5,826,106 | A | 10/1998 | Pang |
| 5,828,869 | A | 10/1998 | Johnson |
| 5,887,162 | A | 3/1999 | Williams |
| 5,896,551 | A | 4/1999 | Williams |
| 6,008,850 | A | 12/1999 | Sumihiro |
| 6,154,826 | A | 11/2000 | Wulf |
| 6,175,901 | B1 | 1/2001 | Williams |
| 6,807,609 | B1 | 10/2004 | Lemmon |

OTHER PUBLICATIONS

*MU v. SCEA* Nov. 2, 2005 Complaint for Patent Infringement (*MicroUnity Systems Engineering, Inc. v. Sony Computer Entertainment America, Inc.*; 2:05–cv–505; USDC for the Eastern District of Texas, Marshall Division).

Feb. 14, 2006 SCEA's Answer, Affirmative Defenses, and Counterclaim to MicroUnity's Original Complaint (*MicroUnity Systems Engineering, Inc. v. Sony Computer Entertainment America, Inc.*; 2:05–cv–505; USDC for the Eastern District of Texas, Marshall Division).

Jan. 25, 2007 First Amended Complaint for Patent Infringement and Exhibits A–J (*MicroUnity Systems Engineering, Inc. v. Sony Computer Entertainment America, Inc.*; 2:05–cv–505; USDC for the Eastern District of Texas, Marshall Division).

Feb. 12, 2007 SCEA's Answer, Affirmative Defenses, And Counterclaims to MicroUnity's First Amended Complaint (*MicroUnity Systems Engineering, Inc. v. Sony Computer Entertainment America, Inc.*; 2:05–cv–505; USDC for the Eastern District of Texas, Marshall Division).

Mar. 5, 2007 SCEA's Invalidity Contentions & Exhibits G–1 to G–8, H–1 to H–8, and I (Exhibits G–9 and H–9 previously marked Outside Counsel Eyes Only, but now released) (*MicroUnity Systems Engineering, Inc. v. Sony Computer Entertainment America, Inc.*; 2:05–cv–505; USDC for the Eastern District of Texas, Marshall Division).

May 1, 2007 SCEA's Supplemental Invalidity Contentions & Exhibits G–1 to G–8, H–1 to H–6, and I (Exhibits G–9 and H–7 previously marked Outside Counsel Eyes Only, but now released) (*MicroUnity Systems Engineering, Inc. v. Sony Computer Entertainment America, Inc.*; 2:05–cv–505; USDC for the Eastern District of Texas, Marshall Division).

May 9, 2007 SCEA's Amended Answer, Affirmative Defenses, And Counterclaims to MicroUnity's First Amended Complaint (*MicroUnity Systems Engineering, Inc. v. Sony Computer Entertainment America, Inc.*; 2:05–cv–505; USDC for the Eastern District of Texas, Marshall Division).

Jul. 11, 2007 SCEA's Second Amended Answer, Affirmative Defenses, And Counterclaims to MicroUnity's First Amended Complaint (*MicroUnity Systems Engineering, Inc. v. Sony Computer Entertainment America, Inc.*; 2:05–cv–505, U.S.D.C., E.D. Texas, Marshall Division).

Jul. 11, 2007 P.R. 4–3 Joint Claim Construction Statement (*MicroUnity Systems Engineering, Inc. v. Sony Computer Entertainment America, Inc.*; 2:05–cv–505, U.S.D.C., E.D. Texas, Marshall Division).

Jul. 16, 2007 Joint Motion to Dismiss Claims Regarding U.S. Patent No. 5,867,735 (*MicroUnity Systems Engineering, Inc. v. Sony Computer Entertainment America, Inc.*; 2:05–cv–505, U.S.D.C., E.D. Texas, Marshall Division).

Jul. 19, 2007 Order Granting Joint Motion to Dismiss Claims Regarding U.S. Patent No. 5,867,735 (*MicroUnity Systems Engineering, Inc. v. Sony Computer Entertainment America, Inc.*; 2:05–cv–505, U.S.D.C., E.D. Texas, Marshall Division).

Aug. 24, 2007 MU's LRP 4–5(a) Opening Brief on Claim Construction, and Exhibits 1–14 (*MicroUnity Systems Engineering, Inc. v. Sony Computer Entertainment America, Inc.*; 2:05–cv–505, U.S.D.C., E.D. Texas, Marshall Division).

Sep. 12, 2007 SCEA's Responsive Brief Regarding Claim Construction Pursuant to P.R. 4–5(b), and Exhibits 1–34 (*MicroUnity Systems Engineering, Inc. v. Sony Computer Entertainment America, Inc.*; 2:05–cv–505, U.S.D.C., E.D. Texas, Marshall Division).

Sep. 13, 2007 SCEA's Unopposed Motion to Supplement P.R. 4–3 Joint Claim Construction Statement, and Proposed Order (*MicroUnity Systems Engineering, Inc. v. Sony Computer Entertainment America, Inc.*; 2:05–cv–505, U.S.D.C., E.D. Texas, Marshall Division).

Sep. 13, 2007 Notice of Filing of P.R. 4–5(d) Joint Claim Construction Chart, and Exhibit 1 (*MicroUnity Systems Engineering, Inc. v. Sony Computer Entertainment America, Inc.*; 2:05–cv–505, U.S.D.C., E.D. Texas, Marshall Div).

Sep. 14, 2007 Order Granting SCEA's Unopposed Motion to Supplement P.R. 4–3 Joint Claim Construction Statement (*MicroUnity Systems Engineering, Inc. v. Sony Computer Entertainment America, Inc.*; 2:05–cv–505, U.S.D.C., E.D. Texas, Marshall Division).

Sep. 17, 2007 LPR 4–5(c) Reply Brief on Claim Construction from MicroUnity Systems Engineering, Inc., and Exhibits 15 and 16 (*MicroUnity Systems Engineering, Inc. v. Sony Computer Entertainment America, Inc.*; 2:05–cv–505, U.S.D.C., E.D. Texas, Marshall Division).

Sep. 20, 2007 Transcript of Claim Construction Hearing Before the Honorable T. John Ward United States District Judge (*MicroUnity Systems Engineering, Inc. v. Sony Computer Entertainment America, Inc.*; 2:05–cv–505, U.S.D.C., E.D. Texas, Marshall Division).

Dec. 12, 2007 Order of Dismissal with Prejudice and Final Judgment (*MicroUnity Systems Engineering, Inc. v. Sony Computer Entertainment America, Inc.*; 2:05–cv–505, U.S.D.C., E.D. Texas, Marshall Division).

*MU* v. *AMD* Claim Chart for the '096 Patent—Exhibit I to AMD's Supplemental and Consolidated Invalidity Contentions—LPR 3–3 served Sep. 5, 2007 in *MicroUnity Systems Engineering, Inc.* v. *Advanced Micro Devices, Inc.;* 2:06–cv–486, U.S.D.C., E.D. Texas, Marshall Division).

82C302 Page/Interleave Memory Controller Data Sheet, Chips and Technologies, Inc. (1987).

Adams et al., "Design a DRAM controller from the top down," *Electronic Design News,* 183–88 (Apr. 27, 1989).

AT386 CHIPSet Functional Specification, Chips and Technologies, Inc. (May 8, 1986).

Boland et al., "The IBM System/360 Model 91: Storage System," *IBM System J.,* 54–68 (Jan. 1967).

Bursky, "Synchronous DRAMs Clock At 100 MHz," *Electronic Design,* vol. 41, No. 4, 45–49 (Feb. 18, 1993).

Busch et al., "Dynamic Random Access Memory Data Burst Control," IBM Technical Disclosure Bulletin, vol. 37, No. 9 (Sep. 1994).

Carnevale et al., "Fast Data Access of DRAMs by Utilizing a Queued Memory Command Buffer," IBM Technical Disclosure Bulletin, vol. 35, No. 7 (Dec. 1992).

"Control Data 6400/6500/6600 Computer Systems Reference Manual," Control Data Corporation, rev. H, Pub. No. 60100000 (Feb. 21, 1969).

"Control Data 6400/6600 Computer Systems Scope Reference Manual," Control Data Corporation, Pub. No. 60173800 (Sep. 1966).

"Control Data 6400/6500/6600 Computer Systems Reference Manual," Control Data Corporation, rev. G, Pub. No. 60189400 (Jan. 31, 1969).

"Control Data 6400/6500/6600 Compass Systems Reference Manual," Control Data Corporation, rev. B, Pub. No. 60190900 (Mar. 20, 1969).

"Control Data 6400/6500/6600 Computer Systems Instant SMM—Maintenance Systems Engineering Manual," Control Data Corporation, rev. A, Pub. No. 60299500 (Nov. 1, 1969).

Cosoroaba, "Synchronous DRAM products revolutionize memory system design," *Fijitsu Microelectronics, Southcon/95,* Mar. 7–9, 1995.

CS4031 CHIPSet Advance Product Information (May 10, 1993).

Diefendorff et al., "Organization of the Motorola 88110 Superscalar RISC Microprocessor," *IEEE Micro,* 40–63 (Apr. 1992).

"ELXSI System Architecture," ELXSI (2d ed. Oct. 1983).

"ELXSI System Foundation Guide," ELXSI (1st ed. Oct. 1987).

Garcia et al., "Single Chip PCI Bridge and Memory Controller for PowerPC™ Microprocessors," IEEE International Conference on Computer Design: VLSI in Computers and Processors, 409–12 (Oct. 1994).

"High–speed DRAMs, Special Report," *IEEE Spectrum,* vol. 29, No. 10, 34–57 (Oct. 1992) (various articles).

IEEE Std 1212.1–1993 (2001)—"IEEE Standard for Communicating Among Processors and Peripherals Using Shared Memory (Direct Access—DMA)," IEEE © (1994).

JEDEC Standard for Configurations for Solid States Memories, JEDEC Standard No. 21–C, release 4 (Nov. 1993).

Lang et al., "Enhanced Refresh Mechanism for Higher Performance in Memory Subsystems," IBM Technical Disclosure Bulletin, vol. 37, No. 10 (Oct. 1994).

McGee et al., "Design of a Processor Bus Interface ASIC for the Strean Memory Controller," Proceedings of the IEEE International SIC Conference, Rochester, NY (Sep. 1994).

McKee et al., "Access Order[ing] and Memory–Conscious Cache Utilization," *Computer Science Report No. CS–94–10* (Mar. 1, 1994).

McKee et al., "Bounds on Memory Bandwidth in Streamed Computations," *Computer Science Report No. CS–95–32* (Mar. 1, 1995).

McKee et al., "Experimental Implementation of Dynamic Access Ordering," Proceedings of the 27th Hawaii International Conference (Jan. 1994), Computer Science Report No. CS–93–42 (Aug. 1, 1993).

McKee, "Hardware Support for Dynamic Access Ordering: Performance of Some Design Options," Computer Science Report No. CS–93–08 (Aug. 9, 1993).

McKee et al., "Increasing Memory Bandwidth for Vector Computations," *Computer Science Report No. CS–93–34* (Aug. 1, 1993), Univ. of Virginia, Reprinted in: *Lecture Notes in Computer Science,* vol. 782, International Conference Zurich, Switzerland (Mar. 2–4, 1994).

McKee, "Maximizing Memory Bandwidth for Streamed Computations," Ph.D. Dissertation, Univ. of Virginia, Faculty of the School of Eng'g and Applied Science (May 1995).

Micron Datasheet for MT48LC2M8S1(S) 2 Meg×8 SDRAM, Micron Semiconductor, Inc., 2–43 to 2–84 (1994).

Moyer, "Access Ordering Algorithms for a Multicopy Memory," *IPC–TR–92–013* (Dec. 18, 1992).

Moyer, "Access Ordering Algorithms and Effective Memory Bandwidth," Ph.D. Dissertation, Univ. of Virginia (May 1993).

"MPC105 PCI Bridge/Memory Controller Technical Summary," Motorola, Inc. (Jan. 1995).

PSX "CPU and Peripheral Specifications," version 1.3, SCE © (1994) (SCEA–0411826–890) (Previously marked Confidential—Counsel Eyes Only, but released for submission per MU/Sony settlement agreement).

"PSX CPU User's Manual," version 1.1, SCE © 1994 (SCEA–0006319–440) (Previously marked Confidential—Counsel Eyes Only, but released for submission per MU/Sony settlement agreement).

Reddi et al., "A Conceptual Framework for Computer Architecture," *Computing Surveys,* vol. 8, No. 2 (Jun. 1976).

Smith, "Dynamic Instruction Scheduling and the Astronautics ZS–1," *Computer,* vol. 22, No. 7, 21–35 (Jul. 1989).

Thornton, Design of a Computer: The Control Data 6600, Scott, Foresman and Co. (1970).

Wang et al., "Designing the MPC105 PCI Bridge/Memory Controller," IEEE Micro, 44–49 (Apr. 1995).

Mark 33 Digital Information Transfer System Part 1 to Part 3, Aeronautical Radio, Inc. (ARINC), May 17, 2004.

Brinkley Sprunt et al., Priority–Driven, Preemptive I/O Controllers for Real–Time Systems, IEEE, 1988, pp. 152–159.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–34 is confirmed.

* * * * *